(12) United States Patent
Castano Cano et al.

(10) Patent No.: US 10,126,189 B2
(45) Date of Patent: Nov. 13, 2018

(54) MULTIDIMENSIONAL RESONANT FORCE SENSOR

(71) Applicant: COMMISSARIAT A L'ÉNERGIE ATOMIQUE ET AUX ÉNERGIES ALTERNATIVES, Paris (FR)

(72) Inventors: Davinson Castano Cano, Antony (FR); Mathieu Grossard, Verrieres le Buisson (FR); Arnaud Hubert, Compiegne (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/532,079

(22) PCT Filed: Nov. 25, 2015

(86) PCT No.: PCT/EP2015/077585
§ 371 (c)(1),
(2) Date: May 31, 2017

(87) PCT Pub. No.: WO2016/096341
PCT Pub. Date: Jun. 23, 2016

(65) Prior Publication Data
US 2017/0276559 A1 Sep. 28, 2017

(30) Foreign Application Priority Data
Dec. 16, 2014 (FR) ...................................... 14 62476

(51) Int. Cl.
*G01L 1/00* (2006.01)
*G01L 5/16* (2006.01)
(Continued)

(52) U.S. Cl.
CPC .............. *G01L 5/167* (2013.01); *G01L 1/162* (2013.01); *G01L 1/183* (2013.01); *G01L 5/16* (2013.01)

(58) Field of Classification Search
CPC ................................. G01L 5/167; G01L 1/162
(Continued)

(56) References Cited

U.S. PATENT DOCUMENTS 5,458,000 A * 10/1995 Burns .................. G01D 3/0365
73/497
5,808,210 A * 9/1998 Herb ....................... G01L 9/002
73/704
(Continued)

FOREIGN PATENT DOCUMENTS

WO     2011/061334 A1     5/2011

OTHER PUBLICATIONS

A. Cheshmehdoost et al., "Design and performance characteristics of an integrated high capacity DETF-based force sensor," Sensors and Actuators A: Physical, vol. 52, No. 13, pp. 99-102, Mar. 1996.
(Continued)

*Primary Examiner* — Max Noori
(74) *Attorney, Agent, or Firm* — Baker & Hostetler LLP

(57) ABSTRACT

A resonant sensor includes a proof body having a first and a second interface that can each come into contact with an external mechanical structure; two sensitive zones arranged between these two interfaces; a sensitive zone formed by a plate embedded in a frame secured mechanically to the interfaces, the plate able to resonate under the effect of local mechanical excitations produced at particular points by excitation transducers bearing the plate at several resonant frequencies, sensors picking up the resonant signals produced at the particular points, measurement means measuring the resonant frequency shifts of signals which are linear combinations of the resonant signals picked up, the shifts being a function of mechanical stresses induced by the forces and transmitted to the plate by the frame, the components of the torque of forces being determined from the resonant frequency shifts measured on the plates of the sensitive zones.

15 Claims, 9 Drawing Sheets

(51) Int. Cl.
*G01L 1/16* (2006.01)
*G01L 1/18* (2006.01)

(58) Field of Classification Search
USPC .................................................. 73/862.046
See application file for complete search history.

(56) References Cited

U.S. PATENT DOCUMENTS

| | | | | |
|---|---|---|---|---|
| 7,379,629 B1* | 5/2008 | Burns | ..................... | G01L 9/002 |
| | | | | 385/12 |
| 2011/0239773 A1* | 10/2011 | Klosinski | .............. | G01L 9/0016 |
| | | | | 73/724 |
| 2012/0279319 A1* | 11/2012 | Boukallel | ............... | G01L 1/106 |
| | | | | 73/862.59 |

OTHER PUBLICATIONS

T. Fabula et al., "Triple-beam resonant silicon force sensor based on piezoelectric thin films," Sensors and Actuators A: Physical, vol. 42, No. 13, pp. 375-380, Apr. 1994.
C. Barthod et al., "Resonant force sensor using a PLL electronic," Sensors and Actuators A: Physical, vol. 104, No. 2, pp. 143-150, Apr. 2003.
Davinson Castano-Cano et al., "Multi-axis Force Sensing with Pre-stressed Resonant Composite Plates: An Alternative to Strain Gauge Force Sensors," 2014 IEEE/ASME International Conference on Advanced Intelligent Mechatronics, Jul. 8-11, 2014, pp. 1361-1367.

* cited by examiner

MULTIDIMENSIONAL RESONANT FORCE SENSOR

CROSS-REFERENCE TO RELATED APPLICATIONS

This application is a National Stage of International patent application PCT/EP2015/077585, filed on Nov. 25, 2015, which claims priority to foreign French patent application No. FR 1462476, filed on Dec. 16, 2014, the disclosures of which are incorporated by reference in their entirety.

FIELD OF THE INVENTION

The present invention relates to a multidimensional resonant force sensor. It applies in particular to the fields of robotics, mechatronics and more generally all the technical fields requiring force measurements.

BACKGROUND

As an intensive property, a force cannot be measured directly. Force sensors make it possible to estimate the force applied via the deformation or the displacement of a proof body.

A force sensor is a device which brings together both electronics and mechanics. It makes it possible to convert a force, that is to say a physical vector quantity into an electrical quantity. To do this, there are various technologies and physical principles of sensors for measuring force, whether in the form of forces or moments. In particular among the sensors that can be cited there are those constructed by using mechanical deformation gauges connected to an appropriate electronic bridge, generally a Wheatstone bridge. This type of sensor is the one most commonly encountered, both in the industrial environment and in the scientific literature. For all that, this principle does present a certain number of drawbacks, among which the measurement noise and the phenomena of lifting of the gauges on the proof body of the sensor can be cited.

Another physical principle that makes use of resonant mechanisms is also the basis for a few force sensors. The resonant sensors use the measurement of the frequency variation of mechanical resonances of a structure by means of transducers to estimate a force.

Currently, the force sensors using the resonant structure principle do not make it possible to directly and simultaneously measure all the components of the force torque applied to the proof body of the sensor. For the moment, there are unitary resonant sensors which remain limited to measuring a single force component (longitudinal or transverse force). The measurement of some other components of the force torque can be done only by adding to the host structure other unitary sensors whose spatial configuration makes it possible to measure force components in other directions. The dynamic and simultaneous reconstruction of all the components of the force torque is not therefore direct.

In particular, resonant force sensors with geometries of "beam" type are known, produced with configurations of one, two or even three parallel beam type, as described in particular in the documents by A. Cheshmehdoost and B. E. Jones, Design and performance characteristics of an integrated high capacity DETF-based force sensor, Sensors and Actuators A: Physical, 52(13): 99-102, March 1996 and by T. Fabula, H. J. Wagner, B. Schmidt, and S. Buttgenbach, Triple-beam resonant silicon force sensor based on piezoelectric thin_lms, Sensors and Actuators A: Physical, 42(13): 375-380, April 1994. These offer advantages over the so-called "single-beam" configuration cases, for example, better quality factor, and greater sensitivity. This type of structure has been used to measure a single component of the force, generally that whose direction is aligned along the axis of the beam. A document by C. Barthod, Y. Teisseyre, C. Ghin, and G. Gautier, Resonant force sensor using a PLL electronic, Sensors and Actuators A: Physical, 104(2):143-150, April 2003, describes non-axial force measurements in which the structures use transformation mechanisms. However, these mechanisms are expensive and complex to implement.

One technical problem to be solved is therefore how to produce a resonant force sensor that can measure the force components in all six dimensions, that is to say the three dimensions of force and the three dimensions of torque, that is also reliable and economical.

SUMMARY OF THE INVENTION

One aim of the invention is notably to allow the production of such a multidimensional resonant force sensor. To this end, the subject of the invention is a resonant force sensor, said sensor comprising a proof body that can be subjected to a torque of forces produced by an external mechanical structure, said body comprising at least:

a first interface and a second interface that can each come into contact with said structure;

at least two sensitive zones each arranged between these two interfaces;

a sensitive zone being formed by a plate embedded in a frame secured mechanically to said interfaces, said plate being able to resonate under the effect of local mechanical excitations produced at particular points by excitation transducers bearing said plate at several resonant frequencies, sensors picking up the resonant signals produced at said particular points, measurement means measuring the resonant frequency shifts of signals which are linear combinations of the resonant signals picked up, said shifts being a function of mechanical stresses induced by said forces and transmitted to said plate by said frame, the components of said torque of forces being determined from the resonant frequency shifts measured on the plates of said sensitive zones.

Said excitations are for example produced simultaneously.

In a particular embodiment, said particular points are situated on vibratory mode nodal lines so as to make it possible to select particular mode resonant frequencies by said combinations.

The combination of said frequencies is for example an addition or subtraction operation.

In one possible embodiment, each plate having a dimension according to an x axis and a dimension according to a y axis, it comprises four particular excitation points, a North point and a South point being situated on the axis of symmetry of said plate according to y, and a West point and an East point being situated on the axis of symmetry according to x, said North and South and West and East points being situated symmetrically relative to the intersection of the two axes of symmetry. Three resonant frequencies of three vibratory modes are for example selected, a frequency of a first mode being selected by adding the resonant frequencies of the North point and of the South point and/or of the West point and of the East point, a frequency of a second mode being selected by performing a subtraction between the measurement of the North point and the measurement of the South point, and a third frequency of a third mode being selected by performing a subtraction between the measurement of the West point and the measurement of the East point.

The shift measurements are for example performed by phase-locked loop circuits whose output signal controls a transducer.

Said transducers are for example of piezoelectric type.

The sensors are for example of piezoelectric type, each fixed facing a transducer on the other side of the face of said plate, the signals produced being the charge signals of said sensors of piezoelectric type.

Said proof body is for example monolithic.

Said sensitive zones form for example a non-zero angle with said interfaces giving said proof body a pyramidal appearance.

In another possible embodiment, said zones form a zero angle with said interfaces, giving said proof body a flattened appearance.

The geometry of said proof body is for example invariant according to the angle separating the central points of two sensitive zones.

Said sensitive plate is for example placed outside of the neutral axis of the assembly formed by the frame and said plate.

A protective jacket covers for example said proof body.

BRIEF DESCRIPTION OF THE DRAWINGS

Other advantages and features of the invention will become apparent from the following description, given in light of the attached drawings which represent.

DETAILED DESCRIPTION

Figure 1A:
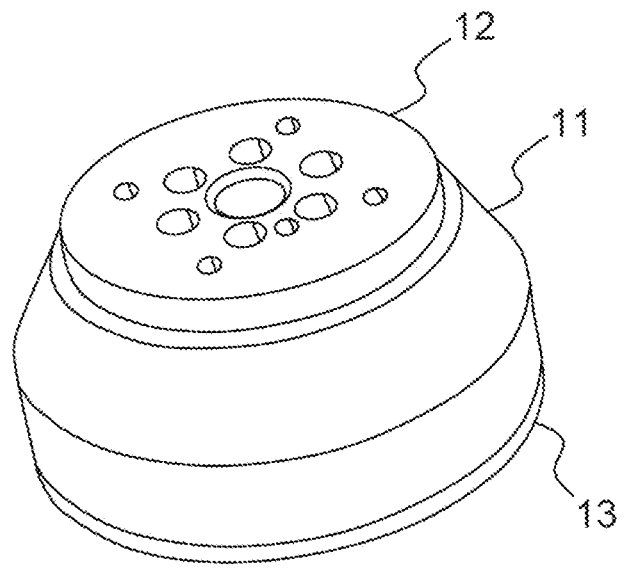
FIGS. 1a to 1d, an exemplary embodiment of a sensor according to the invention from several perspective views.

FIGS. 1a to 1d show, by several perspective views, an exemplary embodiment of a sensor according to the invention. FIG. 1a shows the sensor provided with a protective jacket 11, having a downstream face 12 and an upstream face 13. When the sensor is mounted in an external mechanical structure generating the forces to be measured, the downstream face 12 is in contact therewith and is oriented toward the downstream part of the structure, and the upstream face 13 is in contact with the same structure, oriented towards the upstream part thereof. Holes are provided in these faces to allow the sensor to be fixed to the mechanical structure.

Figure 1B:
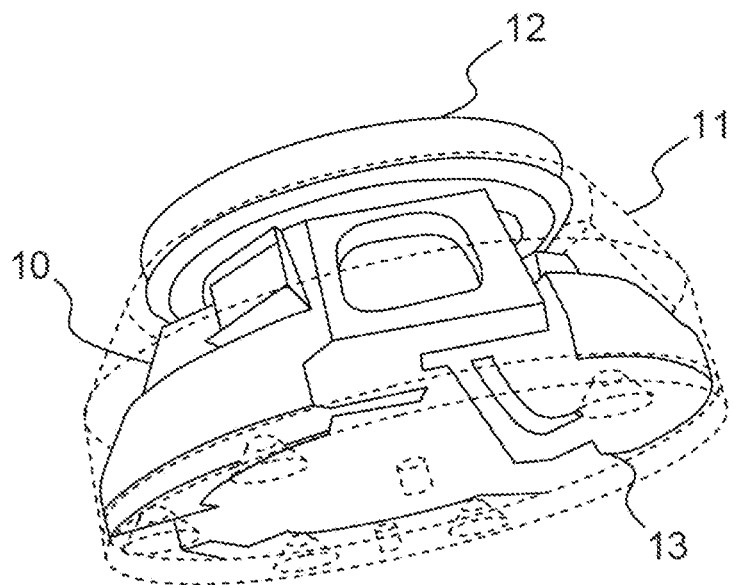

FIG. 1b shows the sensor from another view with the protective jacket 11 represented transparently to show the interior.

Figure 1C:
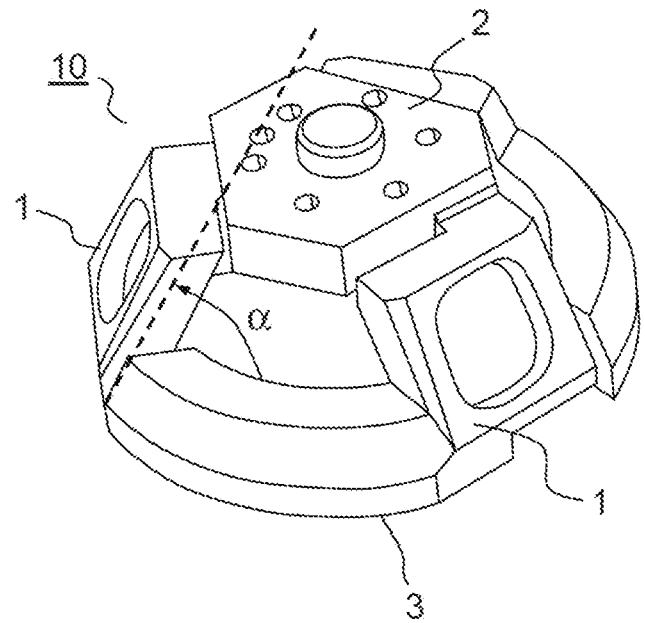

FIG. 1c shows a rigid proof body 10 that is seen inside the jacket 11 in FIG. 1b. The proof body comprises at least:
- A downstream interface 2 intended to come into contact with the external mechanical structure, not represented, via the downstream face 12 of the jacket;
- An upstream interface 3 intended to come into contact with the external mechanical structure via the upstream face 13 of the jacket;
- A set of sensitive zones 1, based on vibrating plates, arranged between these two interfaces, the loads produced by the mechanical structure being transmitted to these sensitive zones by these interfaces 1, 2.

These sensitive zones 1 are secured mechanically to the interfaces 2, 3 so as to form therewith a rigid assembly 10. In a preferred embodiment, the proof body 10 can be monolithic, the sensitive zones and the interfaces being formed in a single block. This block can be made of aluminum or of stainless steel, other materials being of course possible provided that they have the appropriate mechanical properties.

The contact face of the interfaces 2, 3 is preferably planar in order to obtain the best contact with the external mechanical structure.

The interfaces 2, 3 for example have holes, tapped or not, to allow the sensor to be fixed to this structure.

Figure 1D:
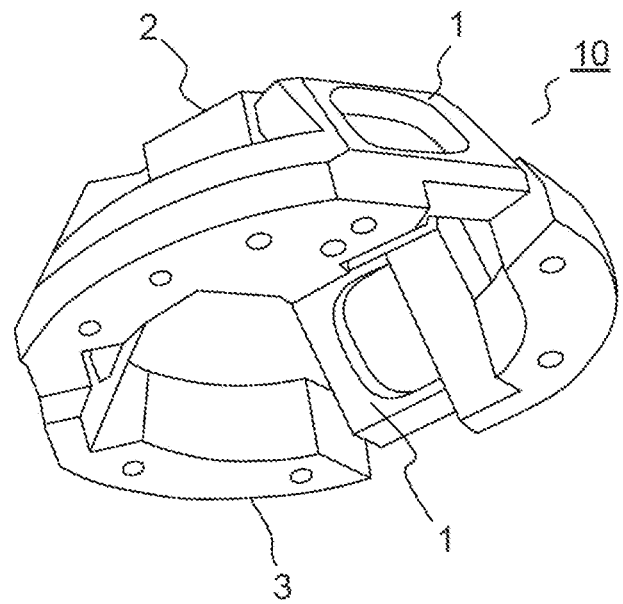

FIG. 1d shows this same proof body seen from the side of the upstream interface 3.

In the example of FIGS. 1a to 1d, the sensitive zones 1 form a non-zero angle α with the plane of the interfaces 2, 3 giving the proof body a pyramidal appearance. It is possible to provide an embodiment in which this angle α is zero, giving the proof body 10 a flat appearance.

One of the downstream 12 and upstream 13 parts of the jacket 11 can take the form of a cap covering the interface 2, 3 that it protects, the jacket 11 then consisting of a jacket and a cap. Other forms and types of protective jacket are possible, provided that they protect the components of the sensor and allow a reliable transmission of the forces produced by the external structure. It is also possible to provide embodiments without a protective jacket.

Figure 2A:
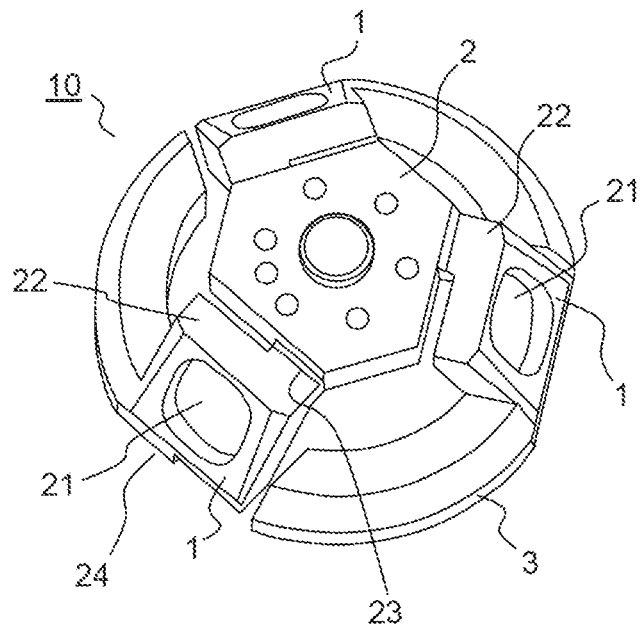
FIGS. 2a and 2b, a more precise illustration of the above example.
Figure 2B:
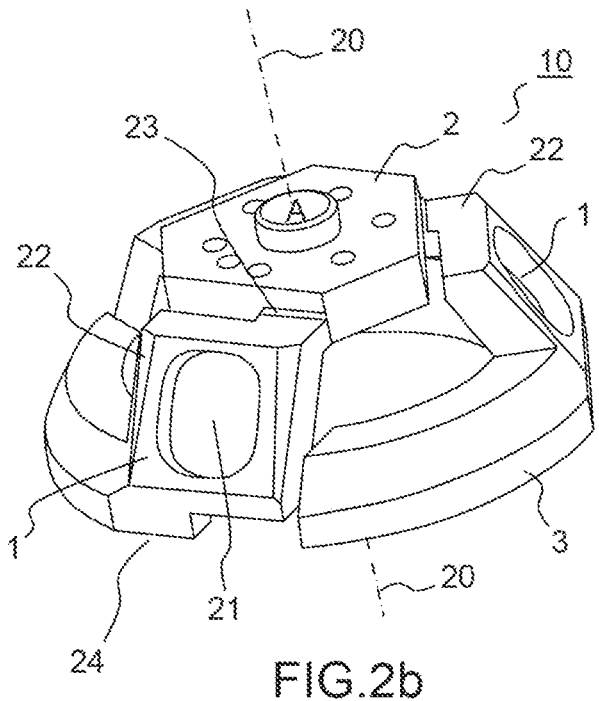

FIGS. 2a and 2b illustrate more particularly the mechanical structure of the sensitive zones 1 and their mechanical links with the interfaces, by two perspective views, in an example in which the proof body 10 comprises three sensitive zones 1, as in FIGS. 1a to 1b.

A sensitive zone 1 is formed by a plate 21 embedded in a frame 22, this plate being able to vibrate under the effect of local mechanical excitations.

More specifically, the plate 21 is made to vibrate by local excitations produced by transducers that are not represented. These transducers, which are for example piezoelectric patches, provoke transverse vibrations in the plate. Hereinbelow, transducers of piezoelectric type will be used by way of example.

Through these transverse vibrations, the plate can enter into mechanical resonance according to the three axes of spaces x, y, z in which the axes x and y are in the plane of the plate and the axis z is at right angles to this plane.

The frame 22 is fixed at its two ends to the interfaces 2, 3. The mechanical link between an end of the frame and an interface is made not over the entire width of the frame but only over a part 23, 24 of the width.

The frames are arranged regularly around the axis 20 of the proof body 10. The structure or geometry thereof is moreover such that it is invariant by 120° rotation, more generally it is invariant according to the angle separating the central points of two sensitive zones.

The force torque produced by the external mechanical structure, that is to say the force to be measured, is assumed to be localized at a point A of intersection of the axis of the body with the downstream interface. This force torque will hereinbelow be denoted $\overset{o}{F}$, called force or force torque without preference.

This torque $\overset{o}{F}=[F_x, F_y, F_z, M_x, M_y, M_z]$ is made up of three force components $F_x$, $F_y$, $F_z$, and three torque components $M_x$, $M_y$, $M_z$.

The structure of the proof body as shown by FIGS. 1a to 1d, and FIGS. 2a and 2b, is optimized such that only the plates 1 resonate, that is to say that the high resonant frequencies transmitted by these vibrating plates to the rest of the proof body are completely negligible and can be disregarded.

The measurement of the force torque is based on the use of the vibrating plates 21 whose frequencies and modal deformations are sensitive to the external forces. In effect, when a quasi-static force $\overset{o}{F}$ is applied to the point A of the proof body, it provokes a prestress $\overset{o}{\sigma}$ to all of the structure of the proof body. In particular, this prestress $\overset{o}{\sigma}$ is transmitted to each resonant plate 21. The principle of operation of the sensor lies in the fact that the natural frequencies and the modal deformations of each vibrating plate are greatly dependent on their limiting conditions, in terms of force and of displacement. The mechanical properties of the plates, in apparent rigidity terms, are in fact altered by this prestress notably provoking a modification of the natural frequency, or resonant frequency. Thus, after a sensor calibration step, the measurements of natural frequency shift of each plate 21, due to the force $\overset{o}{F}$, make it possible to estimate this force in all its dimensions as demonstrated hereinbelow in this description.

Figure 3:
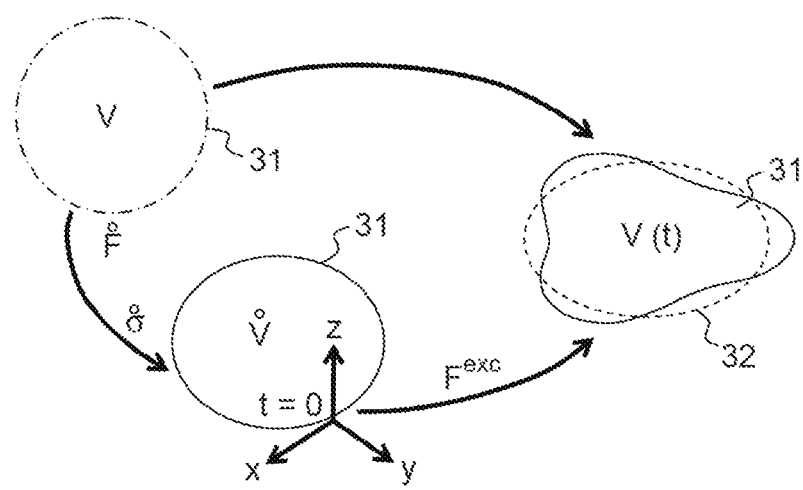
FIG. 3, an illustration of the principle of force detection by resonance.

FIG. 3 illustrates the principle of the detection of forces by a resonant sensor. An initially prestressed body 31 is excited by a force $F^{exc}$ generated by piezoelectric effect for example. This excitation force $F^{exc}$ makes the body 31 resonate with resonances 32. The initial prestress σ affects these resonances.

FIG. 3 therefore shows the body 31 in an initial state V in which it is not subjected to a force. It is then prestressed by an external force $\overset{o}{F}$ and passes into a state $\overset{o}{V}$. In this new state, corresponding to an operational phase, the excitation $F^{exc}$ is applied. This excitation makes the body 31 resonate V(t), the resonant frequency being shifted because of the prestress $\overset{o}{\sigma}$ applied. In other words, the resonant frequency is shifted relative to a state without prestress.

Two types of forces are to be taken into account in this particular case, these forces being characterized by their frequency bands which are very far apart from one another:
 The excitation force $F^{exc}$ is at high frequencies, it is created by the excitation produced by the piezoelectric elements which make the body 31 resonate with resonances, the plates 21 in the case of the present invention. The resonances can be obtained by the application of an electrical potential Φ at the terminals of the piezoelectric elements;
 The forces to be measured $\overset{o}{F}$ are at a relatively low frequency. The relationship between these forces and the resonant frequency shift are due to the prestressing. In the case of a robotics application for example, the frequency band of the prestressing $\overset{o}{\sigma}$ is very far below the resonant frequencies of the body 31 like plates 21. The prestressing can therefore be considered as quasi-static.

By using Freq (σ) to denote the prestressing frequency and Freq ($F^{exc}$) to denote the frequency of the excitation force, this gives: Freq (σ)<<Freq ($F^{exc}$).

A dynamic model of a vibrating plate is notably described in the document by D. Castano-Cano, M. Grossard and A. Hubert: "Multi-axis Force Sensing with Pre-stressed Resonant Composite Plates: An Alternative to Strain Gauge Force Sensors", 2014 IEEE/ASME International Conference on Advanced Intelligent Mechatronics (AIM), Besançon, France, Jul. 8-11, 2014. This model is defined by the following relationship:

$$[M]\begin{Bmatrix}\ddot{U}\\\ddot{\Phi}\end{Bmatrix}+[K]\begin{Bmatrix}U\\\Phi\end{Bmatrix}=\begin{Bmatrix}F^{exc}\\Q\end{Bmatrix} \quad (1)$$

in which [M] is the weight matrix and [K] the stiffness matrix, U is the displacement of a node of a meshed structure, Φ is the electrical potential at the terminals of the electrodes of a piezoelectric element, $F^{exc}$ is the excitation force which produces the vibrations of the plate and Q is the electrical charge on the electrodes of the piezoelectric element.

The weight matrix and the stiffness matrix are defined by the following relationships:

$$[M]=\begin{bmatrix}M & 0\\0 & 0\end{bmatrix} \quad (2a)$$

$$[K]=\begin{bmatrix}K_g(\overset{o}{\sigma})+K_{UU} & K_{U\Phi}\\K_{\Phi U} & K_{\Phi\Phi}\end{bmatrix} \quad (2b)$$

in which [$K_{UU}$] is the mechanical stiffness matrix, [$K_{U\Phi}$]=[$K_{\Phi U}$]$^T$ is the electromechanical coupling matrix and [$K_{\Phi\Phi}$] is the capacitance matrix. The stiffness matrix [K] also comprises the matrix $$[K_g(\overset{o}{\sigma})]$$

which is me geometrical stiffness matrix which takes into account the force to be measured F via the induced prestress $\overset{o}{\sigma}$, as an apparent stiffness variation.

From the relationship (1), the resonant frequency is obtained by the calculation of [M]$^{-1}$ [K].

Figure 4:
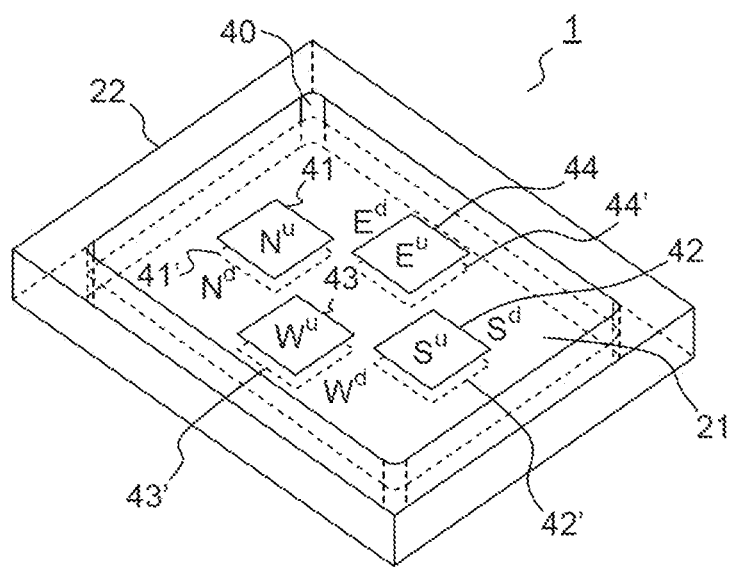
FIG. 4, an exemplary embodiment of a sensitive zone of a sensor according to the invention.

FIG. 4 shows an exemplary embodiment of a sensitive element 1. The latter comprises a rectangular plate 21 embedded in a solid mechanical frame 22. The internal corners 40 of the frame are for example rounded.

Transducers are fixed onto the plate 21. The function of these transducers is to excite the plate 21 at particular points thereof. The transducers are therefore situated at these particular points. In a preferred implementation of the invention, the transducers are piezoelectric elements in the form of patches. Throughout the rest of the description, the transducers used will therefore be, by way of example, piezoelectric patches. In the example of FIG. 4, four piezoelectric patches 41, 42, 43, 44 are fixed onto the face of the plate 21, called top face. These patches are intended to excite the plate. Piezoelectric patches 41', 42', 43', 44' are for example situated on the other face of the plate, facing the patches on top, these patches underneath producing a charge signal making it possible to measure the resonant frequencies of the plate, these patches therefore having an observation function for picking up the resonant frequencies.

The frame 22 prevents the transmission of the high frequencies to the rest of the structure of the proof body and transmits to the plate 21 the effects of the prestress due to the external force, these effects being at low frequencies. In other words, the frame 22 acts as a filter for the high frequencies, when the resonant frequencies are produced on the plate 21, and at the same time makes it possible for the quasi-static force to be transmitted to this same plate.

An electrical potential $\Phi$ is applied to the electrodes of the piezoelectric patches 41, 42, 43, 44 of the top face to make the plate vibrate. The electrical charges Q are measured on the electrodes of the patches 41', 42', 43', 44' of the bottom face to obtain frequency domain signals and therefore measure the resonant frequency.

Figure 5:
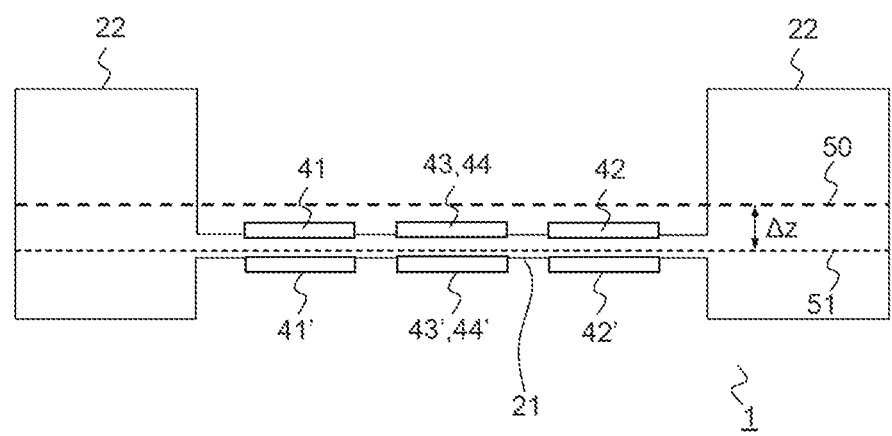
FIG. 5, by a cross-sectional view, a particularly advantageous embodiment of a sensitive zone.

FIG. 5 shows a particularly advantageous embodiment of a sensitive zone 1, by a cross-sectional view. More particularly, FIG. 5 shows a configuration in which the plate 21 is not positioned at the level of the neutral axis 50 of the assembly consisting of the frame and the plate. The neutral axis is defined as the single axis which is not subject to any length variation, regardless of the flexing of the assembly. Thus, in the case of an off-plane force inducing a pure flexing of the plate, there is no prestress in the plane on the axis of the neutral axis. The plate 21 is situated at a level 51 forming a deviation $\Delta z$ with the neutral axis. In this advantageous embodiment, the piezoelectric patches are not sensitive to the induced prestresses.

Figure 6:
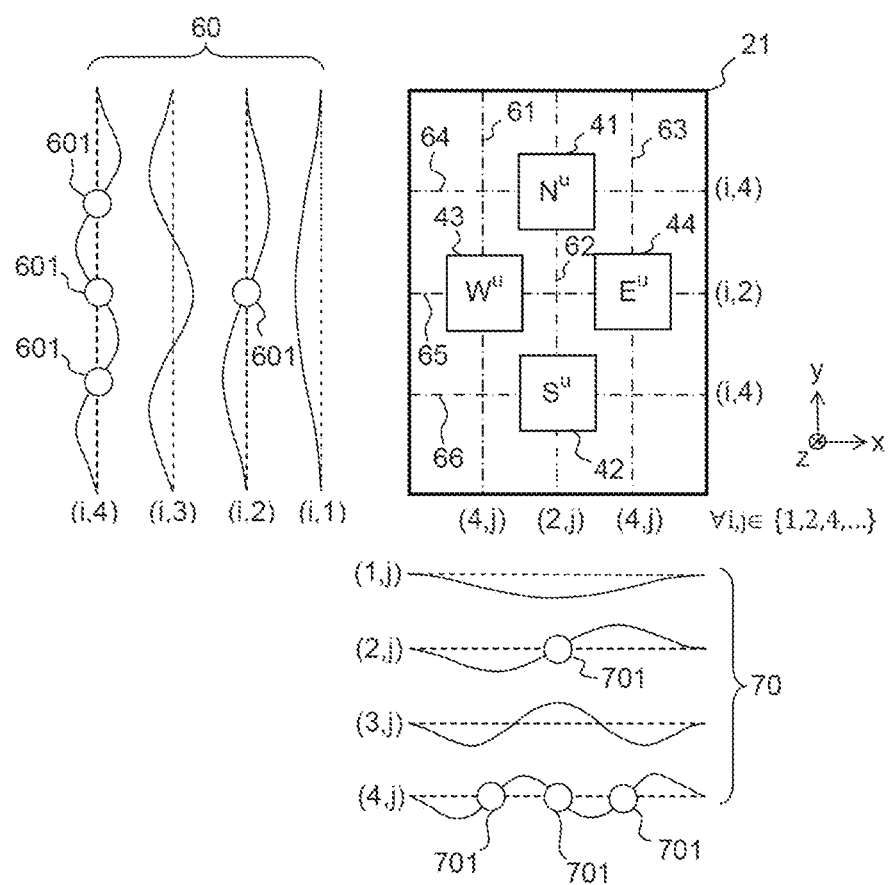
FIG. 6, an example of transducer placement configuration on a plate of a sensitive zone.

FIG. 6 illustrates a particular placement of the patches 41, 42, 43, 44 on the plate 21 and the first excitation modes produced by this particular placement, or particular configuration, of the patches. The excitation modes are represented by the profiles of their deformations, represented opposite their nodal lines on the plate 21.

As will be shown hereinbelow, a sensitive element structure, as illustrated by FIG. 3 or 4, with a particular placement of the piezoelectric patches, coupled with a shrewd strategy for controlling these patches, makes it possible to obtain an efficient multidimensional sensor.

The capacity of a patch to monitor, or observe, a resonant frequency of the plate is directly linked to its relative placement in relation to each nodal line. The way in which the patches are positioned characterizes the modal controllability and observability of the plate. In particular, the placement of the patches on the nodal line of a selected resonant frequency causes them to be insensitive to the corresponding modes, and acts as a modal spatial filter.

FIG. 6 shows a plate 21 in a plane x, y with the nodal lines 61, 62, 63, 64, 65, 66 corresponding to the different vibration modes. The different vibration modes 60, 70 are illustrated opposite the nodal lines. More particularly, the node 701 of the mode (2, j) according to the x axis is represented opposite the nodal line 62, likewise the nodes 701 of the mode (4, j) are represented opposite the nodal lines 61, 62, 63. The same applies for the representation of the modes (i, 2) and (i, 4) according to y, and their nodes 601, opposite the nodal lines 64, 65, 66. The ranks i and j are immaterial.

Conventionally, the patch 41 situated at the top of the view is called North patch. The two patches 43, 44 below are respectively called West patch and East patch in accordance with their position relative to the North patch, and the fourth patch 42 is called South patch. Only the excitation patches 41, 42, 43, 44 are represented, the observation patches 41', 42', 43', 44' being placed on the other face with the same orientation rules.

The North and South patches are placed on the axis of symmetry 62 according to y of the plate and the West and East patches are placed on the axis of symmetry 65 according to x. The North and South patches are placed symmetrically in relation to the intersection of the two axes 62, 65. The same applies for the West and East patches.

In this configuration, the North and South patches are centered on the nodal line 62 of the mode (2, j), the West and East patches are centered on two nodal lines 61, 63 of the mode (4, j), on each side of the preceding nodal line 62. The West and East patches are centered on the nodal line 65 of the mode (i,2), the North and South patches are centered on two nodal lines 64, 66 of the mode (i,4), on each side of the preceding line 65.

The configuration illustrated by FIG. 6 makes it possible to effect a spatial filtering of the modes (i, j) of the plate which have at least a rank, i or j, equal to 2 or to 4. In particular, the North and South patches are insensitive to the mode (2, j) because they are centered on the nodal line of this mode, that is to say that these patches are incapable of activating and/or of measuring this mode.

The description below will be given with this configuration, other configurations being possible.

Figure 7:
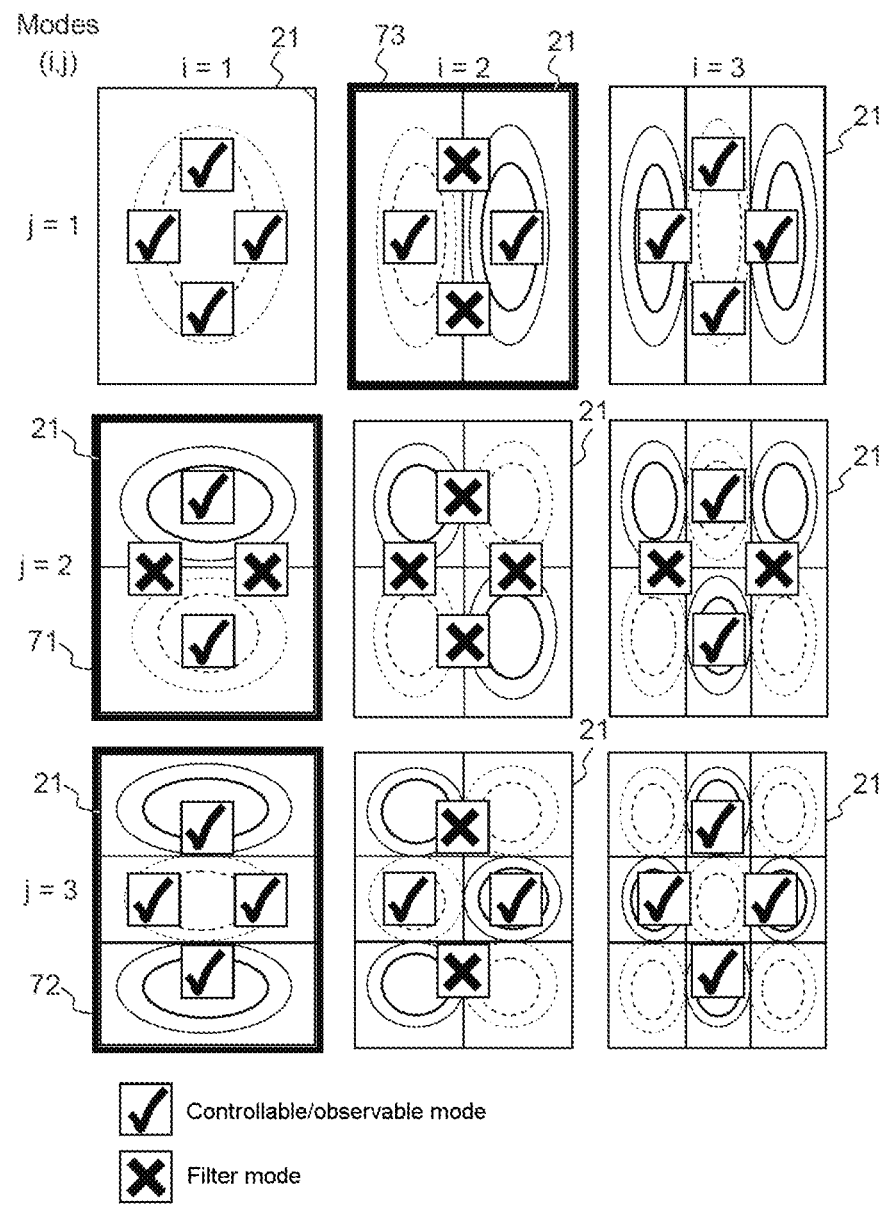
FIG. 7, an illustration of the spatial filter properties of the preceding configuration.

FIG. 7 illustrates this spatial filter property of a sensor according to the invention. More particularly, it illustrates the spatial filtering obtained for the different modes, nine modes being represented corresponding to the ranks i=1 to 3 and j=1 to 3. The North, South, West, East patches are represented each with an indication of their state. The sign V specifies that the patch is in a controllable or observable mode, that is to say that it can excite the mode (i, j) or measure it. A cross indicates that the mode acts as a filter for the mode (i, j), that is to say that it is insensitive for this mode, being unable to either excite it or measure it. By considering that the North and South patches form a first group of patches and that the West and East patches form a second group of patches, FIG. 7 shows in particular that:
   The modes with i=2 or j=2 are partially filtered, which means that a group of patches cannot activate or measure these modes;
   The mode (2, 2) is totally filtered, that is to say that all the patches are incapable of activating or measuring these modes.

It could also be shown, likewise, that the modes with i=4 or j=4 are totally filtered.

The filtering is obtained by placing the patches on the nodal lines symmetrically, as illustrated by the example in FIG. 6.

A placement of the piezoelectric patches, of the type of this example, making it possible to filter resonant frequencies provides advantages. That notably makes it possible to limit the electronic components for the signal processing.

Figure 8:
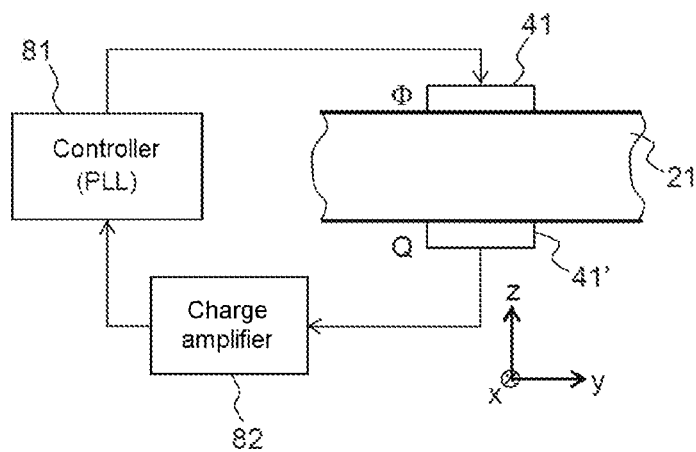
FIG. 8, by a cross-sectional view, a transducer control module.

FIG. 8 illustrates, by a cross-sectional view, an exemplary control module of a piezoelectric patch 41 that can be used in a sensor according to the invention. Since the principle of the force measurement relies on the resonant frequency shift produced by the induced prestress, the module comprises a phase-locked loop circuit 81, also called PLL circuit, controlling the phase of the signal at the resonant frequency of the plate, in closed loop mode. The resonant frequencies are tracked by using a phase reference $\Delta\Phi_{ref}=\Pi r/2$, because, for the collocated patches 41, 41', the resonance is characterized by a phase difference of Π/2 between the input signal of the excitation patch 41 and the output signal of the observation patch 41'. The PLL circuit thus makes it possible to measure the resonant frequency shifts, notably due to the prestresses to which the plate is subjected. An amplifier 82 can for example amplify the signals between the output of the observation patch 41' and the PLL circuit.

Figure 9:
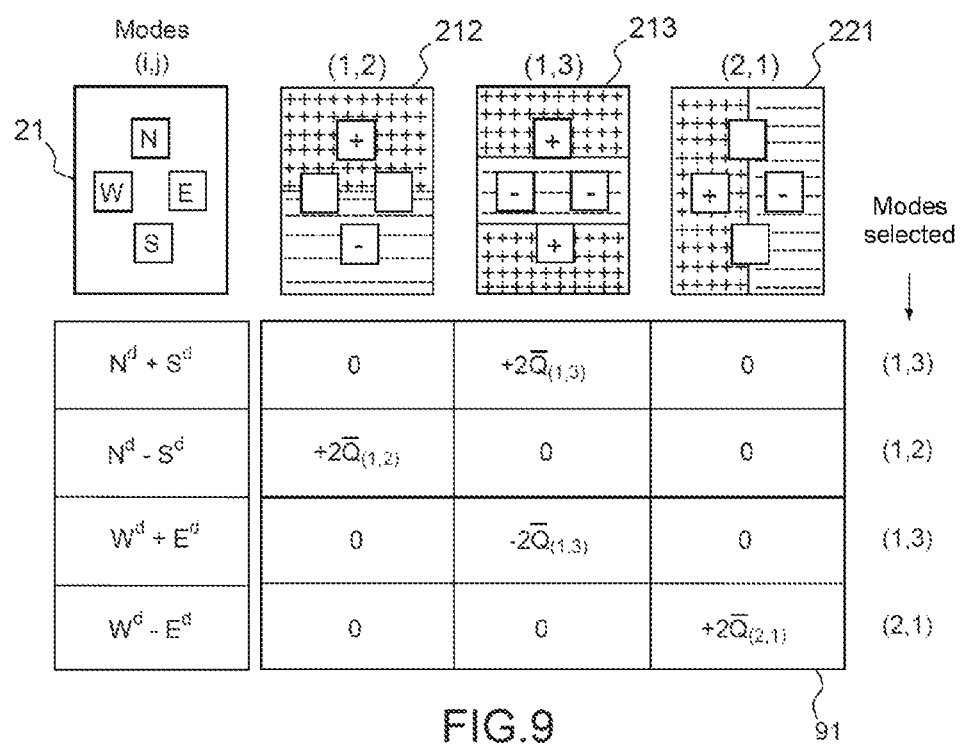
FIG. 9, an illustration of a transducer control strategy.

FIG. 9 illustrates an example of patch control strategy with three particular excitation modes. The excitation modes retained are the modes (1, 2), (1,3), (2, 1) whose states 71, 72, 73 are represented in FIG. 7.

For example, the simultaneous estimation of three force components $\overset{o}{F}_x$, $\overset{o}{F}_y$, $\overset{o}{F}_z$, necessitates measuring, at the same time, the frequency shifts of three resonant modes. This superimposing of the modes is implemented in a sensor according to the invention by using three sinusoidal signals centered on the selected resonant frequencies, which are applied to the different activation patches. The resonant frequencies used are for example those of three modes (1, 2), (1,3), (2, 1). The three excitations applied for example to the North ($N^u$), West ($W^u$) and South ($S^u$) excitation patches can be described by the following set of relationships:

$$\begin{cases} \Phi_{(1,2)}^{N^u} = \overline{\Phi}_{(1,2)}^{N^u} \sin(\omega_{(1,2)} t) \\ \Phi_{(2,1)}^{W^u} = \overline{\Phi}_{(2,1)}^{W^u} \sin(\omega_{(2,1)} t) \\ \Phi_{(1,3)}^{S^u} = \overline{\Phi}_{(1,3)}^{S^u} \sin(\omega_{(1,3)} t) \end{cases} \quad (3)$$

in which $\Phi_m^{X^u,t}$ is the amplitude of the sinusoid applied to the patch $X^u$ for the mode m, $X^u$ being $N^u$, $W^u$ or $S^u$, m being the mode (1, 2), (1,3) or (2, 1).

The response of a plate 21 to this set of simultaneous excitations generates electrical charges on the electrodes of the observation patches. The signal from each electrode can be expressed as the superimposition of the contributions of all the excitation signals. $\overline{Q}_m^{X^{u,d}}$ is used to denote the charge at a point on the electrodes of a patch $X^{u,d}$ for a mode m, $X^{u,d}$ being any one of the North ($N^u$), West ($W^u$), East ($E^u$) and South ($S^u$) excitation patches or of the North ($N^d$), West ($W^d$), East ($E^d$) and South ($S^d$) observation patches.

The overall charge $Q^{X^{u,d}}$ on the electrodes of a patch $X^{u,d}$ can be given by the following relationship, M being the set of the modes (1, 2), (1,3) or (2, 1):

$$Q^{X^{u,d}} = \Sigma_{m \in M} \overline{Q}_m^{X^{u,d}} \sin(\omega_m t + \Delta \Phi_m(X^{u,d})) \quad (4)$$

The amplitude of the charge signal given by this relationship (4) exhibits a few properties based on the modal deformations:

1. When a patch $X^{u,d}$ is placed on a nodal line for a mode m, the result is that $\overline{Q}_m^{X^{u,d}} = 0$;
2. For two geographically opposite patches, that is to say North/South or West/East, which are not on a nodal line for a mode m, the sign of the charge amplitude $\overline{Q}_m^{X^{u,d}}$ depends on the parity of the rank of the mode, j for the North and South patches and i for the West and East patches, in particular:

$$\overline{Q}_m^{N^{u,d}} = (-1)^{j+1} \overline{Q}_m^{S^{u,d}} \text{ and } \overline{Q}_m^{W^{u,d}} = (-1)^{i+1} \overline{Q}_m^{E^{u,d}} \quad (5)$$

By exploiting these two properties, control strategies can be implemented between the signals to extract a single modal component. These control strategies can be implemented simply by additions and subtractions as illustrated in FIG. 9.

FIG. 9 more particularly illustrates how to extract the signals measured for each of the modes (1, 2), (2, 1) and (1,

3). According to the invention, while these modes are excited simultaneously for example, addition or subtraction operations are performed between the signals obtained from the observation patches $N^d$, $S^d$, $W^d$ and $E^d$. A table 91 shows the results obtained for each operation and for each mode, taking into account the above two properties. For each column of the table, corresponding to a mode, the sign of the charge signal picked up by the patches is specified by a representation 211, 212, 213. If they are insensitive to the mode, the patches are represented by a black square. Thus, for the mode (1, 2) whose profile is notably illustrated by FIG. 6, the signal on the patch $N^d$ is positive and the signal on the patch $S^d$ is negative. This is a representation 211 at a given instant, these signs being able to be reversed at another instant, the representation 212 symbolizing the fact that the signs are opposite between the two patches $N^d$ and $S^d$. The other patches $W^d$ and $E^d$ which are in the "insensitive" state in the mode (1, 2) are represented by a black square. The principle of representation is the same for the representations 213, 221 of the other modes.

The first line of table 91 shows the results of a first operation. This first operation produces the sum of the charge signal of the North patch $N^d$ and of the charge signal of the South patch $S^d$, operation denoted $N^d + S^d$. Given the states of the patches symbolized by the different representations 212, 213, 221 and the preceding properties 1 and 2, it follows that only the mode (1, 3) is selected, the charge signal being equal to $+2Q_{(1, 3)}$. It is likewise shown that:

The mode (1, 2) is selected by the operation $N^d - S^d$;
The mode (1, 3) is also selected by the operation $W^d + E^d$;
The mode (2, 1) is selected by the operation $W^d - E^d$;
note that the mode (1, 3) can be selected by two operations, $N^d + S^d$ and $W^d + E^d$.

This redundancy can advantageously be used to check the validity of the measurement method, the two signals $N^d + S^d$ and $W^d + E^d$ having to be in phase opposition.

The signals at the outputs of the operations are connected to a PLL circuit of the type of FIG. 8, to measure these signals.

Figure 10:
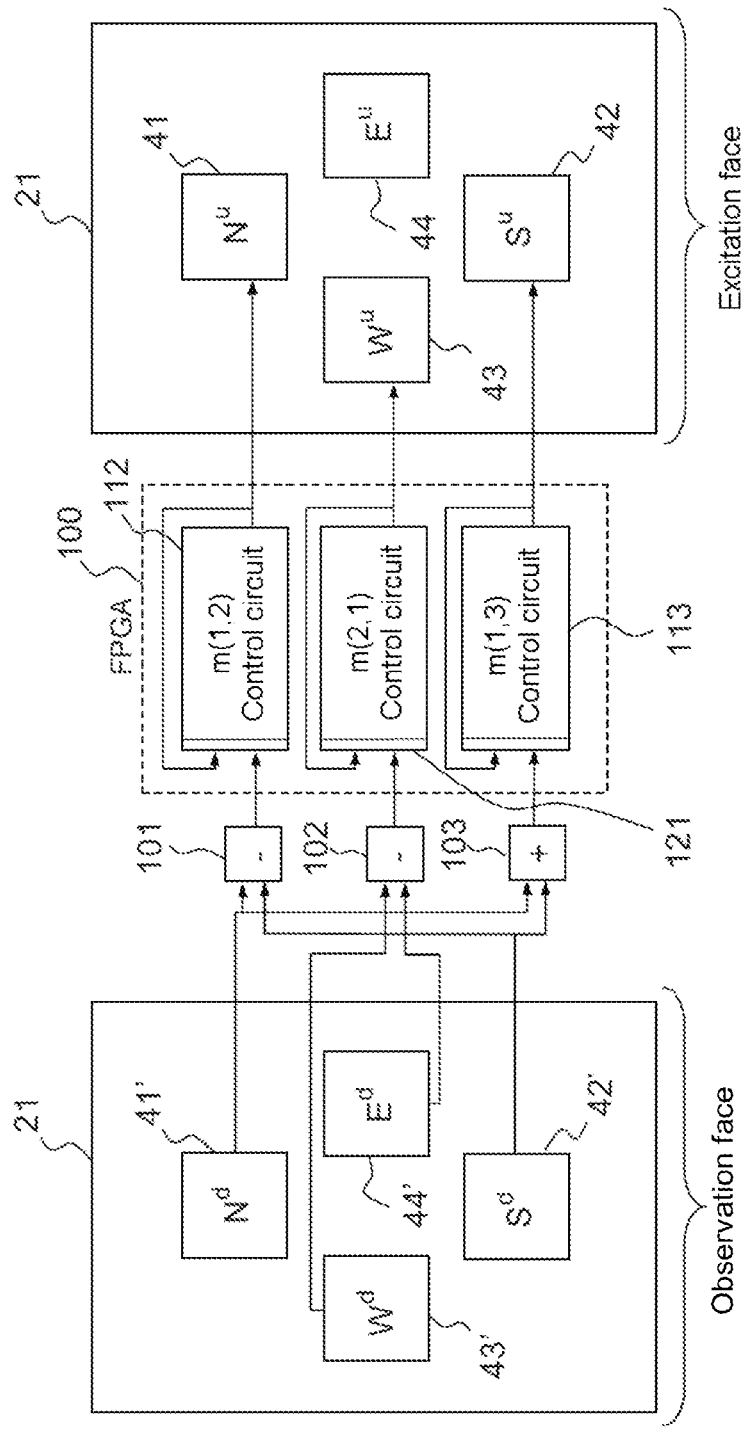
FIG. 10, an example of connection configuration of the output of signal sensors.

FIG. 10 illustrates an exemplary configuration of the connection of the outputs of the observation patches 41', 42', 43', 44' producing the results of the preceding operations, with the superimposition of the modes (1, 2), (2, 1) and (1, 3). The outputs of the patches $N^d$ and $S^d$ are connected to the two inputs of a first subtractor 101 and to the two inputs of an adder 103. The outputs of the patches $W^d + E^d$ are connected to the inputs of a second subtractor 102. The output of the first subtractor selecting the resonant frequency of the mode (1, 2) is linked to the input of a first control circuit 112. Similarly, the output of the second subtractor selecting the resonant frequency of the mode (2, 1) is linked to the input of a second control circuit 121 and the output of the adder selecting the resonant frequency of the mode (1, 3) is linked to the input of a third control circuit 113. The control circuits 112, 121, 113 are formed by a PLL circuit 81 and an amplifier 82 as in FIG. 8. The outputs of the first, second and third circuits are connected respectively to the patches $N^u$, $W^u$ and $S^u$ of the opposite face of the plate, and loop back to the inputs of the PLLs. The control circuits are for example incorporated in an FPGA 100.

Take the exemplary embodiment of a sensor in which the proof body 10 comprises three sensitive zones 1, therefore three plates 21 in accordance with FIGS. 1a to 1 d and 2a and 2b. $\{\Delta f_i\}$ is used to denote the matrix of the resonant frequency shifts of the $i^{th}$ plate, i being equal to 1, 2 or 3. The above example is retained in which the three resonant frequencies are those of the modes (1, 2), (1, 3), (2, 1)

measured in accordance with FIG. 10 for example. $\{\Delta f_i\}$ is a column matrix, or vector, whose components are the shifts of these three resonant frequencies.

By considering that the resonant frequencies vary linearly as a function of the forces to be measured, the relationship between the frequency shifts and the force components to be measured, for the $i^{th}$ plate, is given by the following relationship:

$$\{\Delta f_i\} = [C]_i \{\overset{o}{F}\} \quad (6)$$

in which $\{\overset{o}{F}\}$ is a column matrix made up of the force components to be measured and $[C]_i$ is the characteristic matrix of the $i^{th}$ plate:

$$[C]_i = \begin{bmatrix} c^i_{(1,2),x} & c^i_{(1,2),y} & c^i_{(1,2),z} \\ c^i_{(2,1),x} & c^i_{(2,1),y} & c^i_{(2,1),z} \\ c^i_{(1,3),x} & c^i_{(1,3),y} & c^i_{(1,3),z} \end{bmatrix}_i$$

The matrix $[C]_i$ is a function of the vibratory modes $(1, 2)$, $(1, 3)$ and $(2, 1)$.

To identify each component of the matrix $[C]_i$, an experimental calibration or calibration by simulation can be performed according to each of the three axes x, y and z. Each component according to x, y, and z of the force to be measured $\overset{o}{F}$ is then applied in succession. There are thus obtained, in succession, the components
$[c_{(1,2),x}{}^i, c_{(2,1),x}{}^i, c_{(1,3),x}{}^i]^T$;
$[c_{(1,2),y}{}^i, c_{(2,1),y}{}^i, c_{(1,3),y}{}^i]^T$;
and $[c_{(1,2),z}{}^i, c_{(2,1),z}{}^i, c_{(1,3),z}{}^i]^T$;
of the matrix $[C]_i$.

Thus, each column of the matrix is characterized separately.

To obtain all of the force components in all six dimensions, that is to say the three force components and the three torque components, the characteristic matrix of the proof body 10 is used. This characteristic matrix $[C]$ of the proof body as a whole, taking into account all of the resonant plates 21, can be obtained from characteristic matrices $[C]_i$ of each plate.

From this matrix $[C]$ it is possible to obtain all of the components according to the following relationship:

$$\{\Delta f\} = [C]\{\overset{o}{F}\} \quad (7)$$

in which $\{\Delta f\}$ is the column matrix made up of the frequency shifts measured on all the plates, in accordance with FIG. 10 for example. Knowing the matrices $[C]$ and $\{\Delta f\}$, it is possible to deduce therefrom the force matrix, or force vector $\{\overset{o}{F}\}$, whose components are the force components to be measured. The sensor according to the invention comprises computation means making it possible to extract the components of this vector. These computation means can be incorporated in the FPGA 100 or on a printed circuit for example comprising the FPGA 100, all types of appropriate layout being able to be used.

To obtain a force measurement according to all six dimensions, that is to say according to the three components of the forces and the three torque components, it is essential for the proof body 10 to include at least two resonant plates 21, each plate being able to supply three dimensions, by virtue of the fact that it exhibits several resonances for stresses in the three dimensions x, y, z.

In the present example in which the proof body comprises three plates, the matrix $[C]$ is the transposed matrix of the three matrices $[C]_i$ concatenated, i.e.:

$$[C] = [C_1, C_2, C_3]^T \quad (8)$$

The matrix $\{\Delta f\}$ of the frequency shifts is the concatenation of the three column matrices $\Delta f_1$, $\Delta f_2$, $\Delta f_3$ of the frequency shifts measured on the three plates.

In this example, the matrix $[C]$ is not square but is of dimension 9×6, that is to say comprising 9 rows and 6 columns, the vector $\{\Delta f\}$ having 9 components, which are the 9 measurements of shifts obtained on all of the three plates, and the vector $\{\overset{o}{F}\}$ is a vector having 6 components, which are the six force components.

It is therefore not possible to obtain the vector $\{\overset{o}{F}\}$ sought by a simple matrix inversion, the matrix $[C]$ not being invertible.

Several solutions can be envisaged to extract this vector $\{\overset{o}{F}\}$. It is in particular possible to use the pseudo-inverse matrix $[C]^+$ defined according to the following relationship:

$$[C]^+ = (C^T C)^{-1} C^T$$

$C^T$ being the transposed matrix of $[C]$.

The vector $\{\overset{o}{F}\}$ sought is then obtained according to the following relationship:

$$\{\overset{o}{F}\} = [C]^+ \{\Delta f\} \quad (9)$$

In the present example, more frequency shift measurements are obtained than needed. In effect, 9 measurements are obtained for 6 components. However, this redundancy can advantageously be used to improve the numerical conditioning of the computation means.

The invention has been presented with a proof body 10 comprising three sensitive zones based on vibrating plates, it is possible to provide a greater number of sensitive zones, that is to say plates. The redundancy coefficient is thus increased.

The invention has also been presented by selecting the three vibratory modes $(1, 2)$, $(1, 3)$ and $(2, 1)$. It is of course possible to select other modes, by placing the transducers and sensors at other points of the plate and by performing combinations other than the additions and subtractions of the example given here. More generally, it is possible to perform all linear combinations on the resonant signals picked up, the identity linear combination being of course possible.

A sensor according to the invention can of course be used in the field of robotics, for example for manipulator robotics arms interacting with an environment and driven forcewise using a multi-axial force sensor mounted at its end to control the force exerted at this end. It can also be applied for interactive robotics arms or those interacting with an operator, in a human/robot co-manipulation phase, to estimate the forces imparted by the operator to detect his or her movement intentions.

Advantageously, the invention goes far beyond this scope and can be used in other fields, notably industrial, for which force measurement is necessary. The dimensions of the sensor can be easily adapted to the ranges of forces involved.

The invention claimed is:

1. A resonant force sensor, comprising a proof body that can be subjected to a torque of forces produced by an external mechanical structure, said body comprising:
    a first and a second interface that can each come into contact with said external mechanical structure; and two sensitive zones each arranged between the first and second interface; each sensitive zone being formed by a plate embedded in a frame secured mechanically to said interfaces, said plate including excitation transducers whereby said plate is able to resonate under the effect of local mechanical excitations produced at particular points by the excitation transducers bearing said plate at several resonant frequencies, said plate further including sensors picking up the resonant signals produced at said particular points, wherein a control circuit measures the resonant frequency shifts of signals which are linear combinations of the resonant signals picked up, said shifts being a function of mechanical stresses induced by said forces and transmitted to said plate by said frame, the components of said torque of forces being determined from the resonant frequency shifts measured on the plates of said sensitive zones.

2. The sensor as claimed in claim 1, wherein said excitations are produced simultaneously.

3. The sensor as claimed in claim 1, wherein said particular points are situated on vibratory mode nodal lines so as to make it possible to select particular mode resonant frequencies by said combinations.

4. The sensor as claimed in claim 1, wherein the combination of said frequencies is an addition or subtraction operation.

5. The force sensor as claimed in claim 1, wherein each plate having a dimension according to an x axis and a dimension according to a y axis, it comprises four particular excitation points, a North point and a South point being situated on the axis of symmetry of said plate according to y, and a West point and an East point being situated on the axis of symmetry according to x, said North and South and West and East points being situated symmetrically relative to the intersection of the two axes of symmetry.

6. The sensor as claimed in claim 5, wherein three resonant frequencies of three vibratory modes are selected, a frequency of a first mode being selected by adding the resonant frequencies of the North point and of the South point and/or of the West point and of the East point, a frequency of a second mode being selected by performing a subtraction between the measurement of the North point and the measurement of the South point, and a third frequency of a third mode being selected by performing a subtraction between the measurement of the West point and the measurement of the East point.

7. The sensor as claimed in claim 1, wherein the shift measurements are performed by phase-locked loop circuits whose output signal controls a transducer.

8. The sensor as claimed in claim 1, wherein said transducers are of piezoelectric type.

9. The sensor as claimed in claim 1, wherein the sensors are of piezoelectric type, each fixed facing a transducer on the other side of the face of said plate, the signals produced being the charge signals of said sensors of piezoelectric type.

10. The sensor as claimed in claim 1, wherein said proof body is monolithic.

11. The sensor as claimed in claim 1, wherein said sensitive zones form a non-zero angle with said interfaces giving said proof body a pyramidal appearance.

12. The sensor as claimed in claim 1, wherein said zones form a zero angle with said interfaces, giving said proof body a flattened appearance.

13. The sensor as claimed in claim 1, wherein the geometry of said proof body is invariant according to the angle separating the central points of two sensitive zones.

14. The sensor as claimed in claim 1, wherein the sensitive plate is placed outside of the neutral axis of the assembly formed by the frame and said plate.

15. The sensor as claimed in claim 1, comprising a protective jacket covering said proof body.

* * * * *